United States Patent
Park et al.

(10) Patent No.: US 7,561,236 B2
(45) Date of Patent: Jul. 14, 2009

(54) METHOD OF FABRICATING ARRAY SUBSTRATE FOR IN-PLANE SWITCHING LIQUID CRYSTAL DISPLAY DEVICE

(75) Inventors: Sang-Wook Park, Gumi-si (KR); Byoung-Ho Lim, Gum-si (KR)

(73) Assignee: LG Display Co., Ltd., Seoul (KR)

( * ) Notice: Subject to any disclaimer, the term of this patent is extended or adjusted under 35 U.S.C. 154(b) by 230 days.

(21) Appl. No.: 11/642,881

(22) Filed: Dec. 21, 2006

(65) Prior Publication Data
US 2007/0146605 A1 Jun. 28, 2007

(30) Foreign Application Priority Data
Dec. 28, 2005 (KR) .................. 10-2005-0131444

(51) Int. Cl.
*G02F 1/1343* (2006.01)
(52) U.S. Cl. ............................ 349/141; 349/139
(58) Field of Classification Search .............. 349/139, 349/141
See application file for complete search history.

(56) References Cited

U.S. PATENT DOCUMENTS

2005/0140896 A1* 6/2005 Chae et al. ............... 349/141

FOREIGN PATENT DOCUMENTS

CN 1497311 5/2004
CN 1667477 9/2005

* cited by examiner

*Primary Examiner*—Kevin S Wood
(74) *Attorney, Agent, or Firm*—McKenna Long & Aldridge LLP

(57) ABSTRACT

A method of fabricating an array substrate for an IPS mode LCD device includes: forming a common electrode using a double layer of a transparent material layer and an opaque material layer, the common electrode including a first transparent conductive material; forming source and drain electrodes on an ohmic contact layer and a data line connected to the source electrode, the source and drain electrodes being spaced apart from each other; forming a passivation layer on the source and drain electrodes and the data line, the passivation layer including a drain contact hole exposing the drain electrode; and forming a pixel electrode on the passivation layer, the pixel electrode including a second transparent conductive material and being formed in an alternating pattern with the common electrode.

11 Claims, 10 Drawing Sheets

METHOD OF FABRICATING ARRAY SUBSTRATE FOR IN-PLANE SWITCHING LIQUID CRYSTAL DISPLAY DEVICE

The application claims the benefit of Korean Patent Application No. 2005-0131444, filed on Dec. 28, 2005, which is hereby incorporated by reference for all purposes as if fully set forth herein.

BACKGROUND OF THE INVENTION

1. Field of the Invention

The present invention relates to a liquid crystal display (LCD) device. More particularly, the present invention relates to an array substrate for an in-plane switching liquid crystal display (IPS-LCD) device and a method of fabricating the array substrate.

2. Discussion of the Related Art

Liquid crystal display (LCD) devices use the optical anisotropy and polarization properties of liquid crystal molecules to produce an image. The liquid crystal molecules have long, thin, shapes, and have an initial alignment direction including initial pretilt angles. The alignment direction can be controlled by applying an electric field to influence the alignment of the liquid crystal molecules. Due to an optical anisotropy property of liquid crystal, the refraction of incident light depends on the alignment direction of the liquid crystal molecules. Thus, by properly controlling the applied electric field, an image having a desired brightness can be produced.

Among the known types of liquid crystal displays (LCDs), active matrix LCDs (AM-LCDs), which have thin film transistors (TFTs) and pixel electrodes arranged in a matrix form, are the subject of significant research and development because of their high resolution and superior ability in displaying moving images.

Liquid crystal display (LCD) devices include two substrates spaced apart and facing each other, and a liquid crystal layer interposed between the two substrates. In one type of LCD device, each of the substrates includes an electrode with the electrodes of each substrate facing each other. A voltage is applied to each electrode inducing an electric field between the electrodes. The arrangement of the liquid crystal molecules is changed by varying the intensity of the electric field.

Because the electrodes are positioned respectively on each of the two opposing substrates, the electric field induced between the electrodes is perpendicular to the two substrates. Accordingly, LCD devices of this type have a narrow viewing angle because of the vertical electric field. In order to solve the problem of narrow viewing angle, in-plane switching liquid crystal display (IPS-LCD) devices have been proposed. An IPS-LCD device includes a pixel electrode and a common electrode on the same substrate.

FIG. 1 is a cross-sectional view illustrating an IPS-LCD device according to the related art. In FIG. 1, an IPS-LCD device 5 includes a first substrate 10 and a second substrate 40 with a liquid crystal layer "LC" interposed therebetween. A pixel region "P" is defined on a first substrate 10. A thin film transistor "T" is formed in the pixel region "P" on the first substrate 10 for use as a switching element. Common electrodes 18 and pixel electrodes 30 are also formed in the pixel region "P." The thin film transistor "T" includes a gate electrode 14, a semiconductor layer 22, a source electrode 24, and a drain electrode 26. A gate insulating layer 20 is formed between the gate electrode 14 and the semiconductor layer 22. The common electrodes 18 alternate with and are substantially parallel to the pixel electrodes 30 on the first substrate 10. The common electrode 18 is formed of the same material and on the same layer as the gate electrode 14, and the pixel electrode 30 is formed of the same material and on the same layer as the source and drain electrodes 24 and 26. Even though not shown in FIG. 1, a gate line and a data line crossing each other are also formed on the first substrate 10, and a common line, connected to the common electrodes 18, is formed on the first substrate 10.

A second substrate 40 is spaced apart from the first substrate 10. A black matrix 42 is formed on an inner surface of the second substrate 40 facing the first substrate 10. The black matrix 42 on the second substrate 40 corresponds to the thin film transistor "T," the gate line and the data line on the first substrate 10. A color filter layer 44 including three color filters of red 44a, green 44b, and blue (not shown) is formed on the black matrix 42. The color filter layer 44 corresponds to the pixel region "P" on the first substrate 10. A liquid crystal layer "LC" is interposed between the first substrate 10 and the second substrate 40. The alignment of the liquid crystal layer "LC" is controlled by a horizontal electric field 35 induced between the common electrode 18 and the pixel electrode 30.

FIG. 2 is a plan view illustrating an array substrate for an in-plane switching liquid crystal display (IPS-LCD) device according to the related art. In FIG. 2, a gate line 12 and a data line 28 are formed on a substrate 10. The gate line 12 and the data line 28 cross each other to define a pixel region "P." A common line 16 is spaced apart from and substantially parallel to the gate line 12. A thin film transistor (TFT) "T" is formed at a crossing portion of the gate line 12 and the data line 28. The TFT "T" includes a gate electrode 14, a semiconductor layer 22 on the gate electrode 14, a source electrode 24 and a drain electrode 26. The gate electrode 14 is connected to the gate line 12 and the source electrode 24 is connected to the data line 28. Common electrodes 18 and pixel electrodes 30, which are substantially parallel to and spaced apart from each other, are formed in the pixel region "P." The common electrodes 18 contact the common line 16 and extend into the pixel region "P." The pixel electrodes 30 contact the drain electrode 26 and extend into the pixel region "P."

The IPS-LCD device has a viewing angle wider than an LCD device using a vertical electric field. However, an increase in the viewing angle of the IPS-LCD device is restricted due to a color inversion along top, bottom, right and left viewing angles. To solve the above problems, an IPS-LCD device having common electrodes and pixel electrodes disposed along a horizontal direction has been suggested.

FIG. 3 is a plan view illustrating an array substrate for an IPS-LCD device according to the related art. In FIG. 3, a gate line 52 and a data line 66 are formed on a substrate 50. The gate line 52 and the data line 66 cross each other to define a pixel region "P." A thin film transistor (TFT) "T" is connected to the gate line 52 and the data line 66. The TFT "T" includes a gate electrode 54, an active layer 60 over the gate electrode 54, a source electrode 62 on the active layer 60 and a drain electrode 64 spaced apart from the source electrode 62. The gate electrode 54 is connected to the gate line 52, and the source electrode 62 is connected to the data line 66.

In addition, a common electrode 56 and a pixel electrode 72 are formed in the pixel region "P." The common electrode 56 is formed of the same material and on the same layer as the gate line 52 and the pixel electrode 72 is formed over the common electrode 56 with a gate insulating layer (not shown) and a passivation layer (not shown) between the pixel electrode 72 and the common electrode 56 to prevent contact of the common electrode 56 and the pixel electrode 72. The pixel electrode 72 is formed of a transparent material to improve an aperture ratio. The common electrode 56 includes common horizontal portions 56a, a first common vertical portion 56b and a second common vertical portion 56c. The common horizontal portions 56a are disposed along a horizontal direction, and the first and second common vertical portions 56b and 56c are connected to two end portions of each common horizontal portion 56a, respectively. Further, the pixel electrode 72 also includes pixel horizontal portions 72a, a first pixel vertical portion 72b and a second pixel vertical portion 72c. The pixel horizontal portions 72a are disposed along a horizontal direction, and the first and second pixel vertical portions 72a and 72c are connected to two end portions of each pixel horizontal portion 72a, respectively.

In the IPS-LCD device having the common electrode 56 and the pixel electrode 72 disposed along the horizontal direction, top, bottom, right and left viewing angles are improved by inclining the common electrode 56 and the pixel electrode 72. However, brightness is reduced because the common electrode 56 is formed of an opaque material.

SUMMARY OF THE INVENTION

Accordingly, the present invention is directed to an array substrate for an in-plane switching liquid crystal display device and a method of fabricating the array substrate that substantially obviates one or more problems due to limitations and disadvantages of the related art.

An advantage of the present invention is to provide an array substrate for an in-plane switching liquid crystal display device that includes a common electrode and a pixel electrode formed of a transparent material.

Another advantage of the present invention is to provide a fabricating method of an array substrate for an in-plane switching liquid crystal display device in which a common electrode is formed by exposing multiple layers of transparent and opaque materials.

Another advantage of the present invention is to provide an in-plane switching liquid crystal display device that has improved brightness and display quality due to prevention of a chuck stain, and a fabrication method of the in-plane switching liquid crystal display device.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a method of fabricating an array substrate for an in-plane switching liquid crystal display device includes: forming a common electrode on a substrate using a double layer of a transparent material layer and an opaque material layer, the common electrode including a first transparent conductive material; forming a gate line, a gate electrode and a common line on the substrate, the gate electrode being connected to the gate line, the common line contacting the common electrode; forming a gate insulating layer on the gate line, the gate electrode and the common line; forming an active layer and an ohmic contact layer on the gate insulating layer over the gate electrode; forming source and drain electrodes on the ohmic contact layer and a data line connected to the source electrode, the source and drain electrodes spaced apart from each other; forming a passivation layer on the source and drain electrodes and the data line, the passivation layer including a drain contact hole exposing the drain electrode; and forming a pixel electrode on the passivation layer, the pixel electrode including a second transparent conductive material and being formed in an alternating pattern with the common electrode.

In another aspect, a method of fabricating an array substrate for an in-plane switching liquid crystal display device includes: forming a common electrode on a substrate using a double layer of a transparent material layer and an opaque material layer, the common electrode including a transparent material; forming a gate line and a common line on the substrate, the common line contacting the common electrode; forming a data line crossing the gate line; forming a thin film transistor connected to the gate line and the data line; forming a passivation layer on the thin film transistor; and forming a pixel electrode on the passivation layer, the pixel electrode being connected to the thin film transistor.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 6A to 6G are cross-sectional views, which are taken along a line VI-VI of FIG. 4, illustrating a method of fabricating an array substrate for an in-plane switching liquid crystal display device according to an embodiment of the present invention.

DETAILED DESCRIPTION OF THE ILLUSTRATED EMBODIMENTS

Reference will now be made in detail to an embodiment of the present invention, an example of which is illustrated in the accompanying drawings.

In a liquid crystal display device according to the present invention, a common electrode and a pixel electrode are formed on different layers and of a transparent material. In addition, the common electrode is formed through a step of exposing multiple layers having a transparent layer and an opaque layer.

Figure 1:
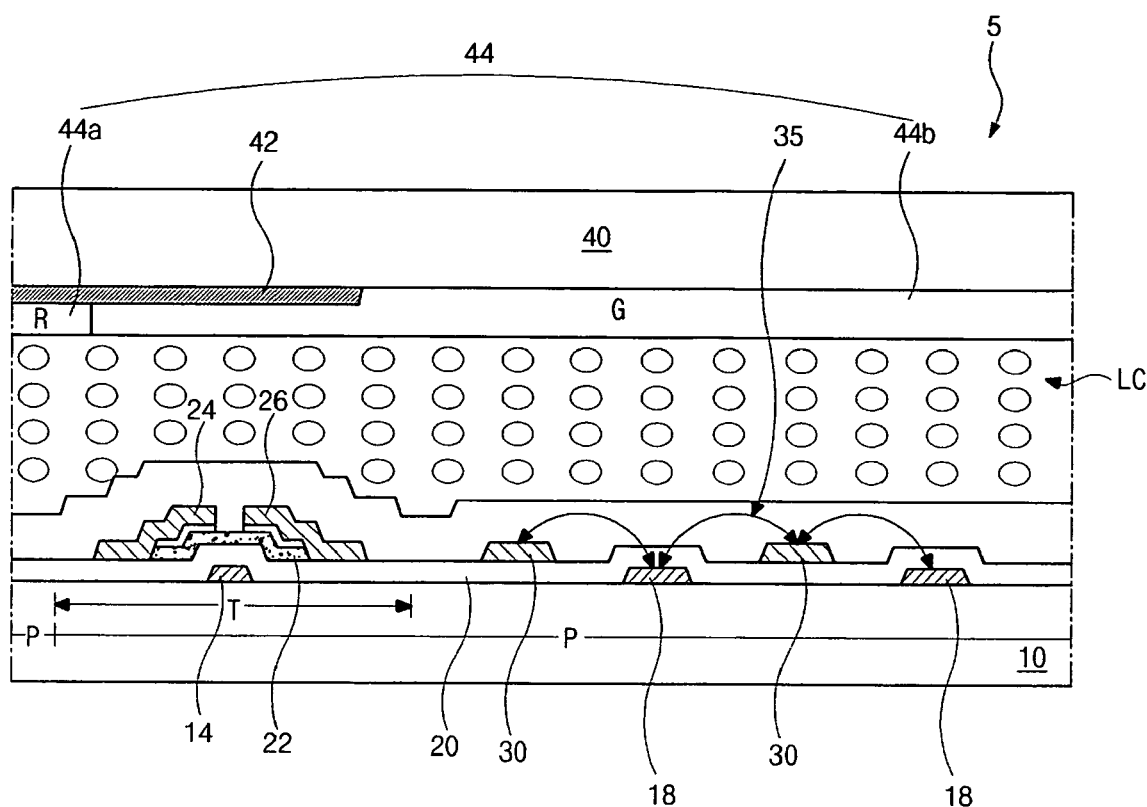
FIG. 1 is a cross-sectional view illustrating an IPS-LCD device according to the related art.
Figure 2:
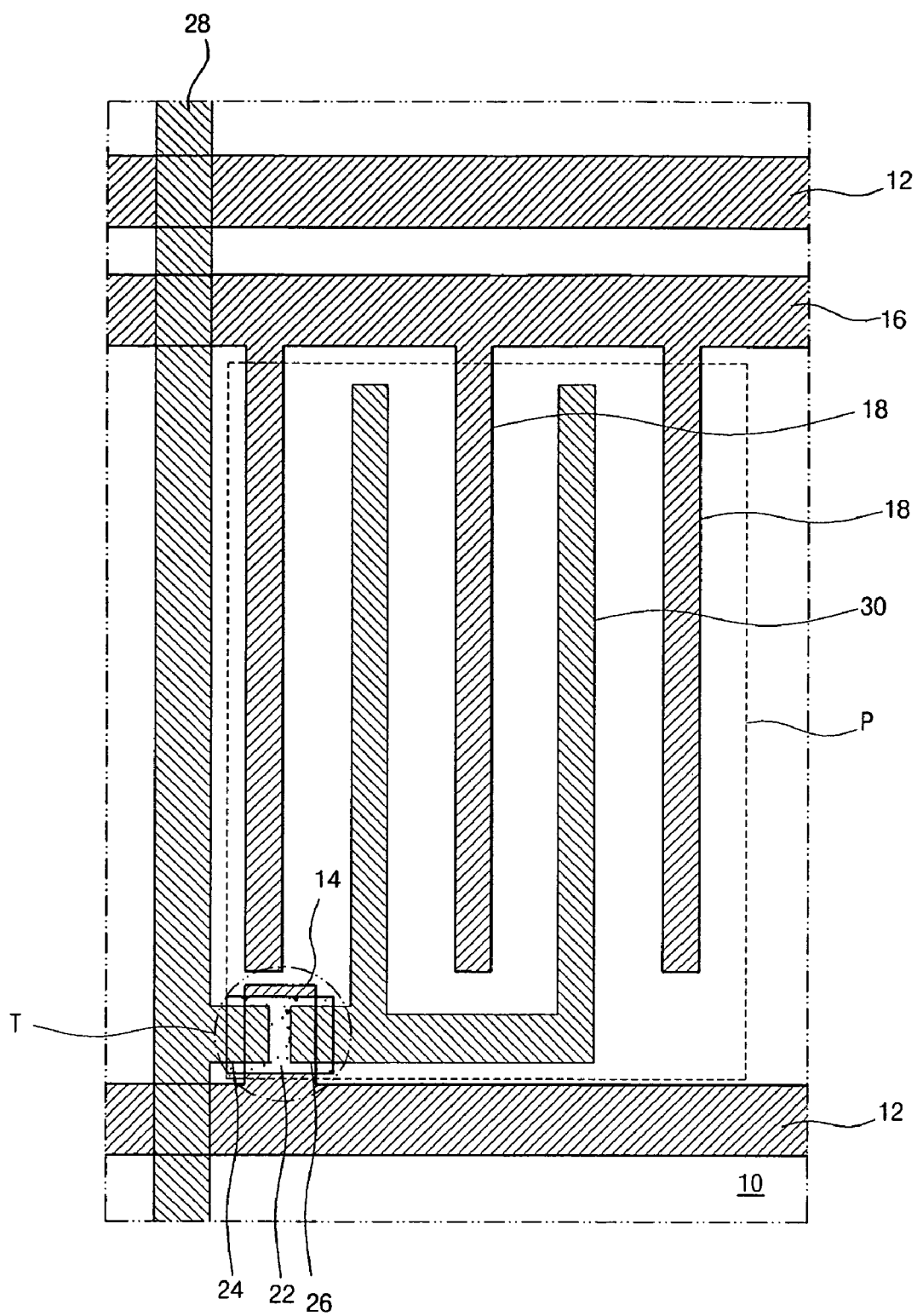
FIG. 2 is a plan view illustrating an array substrate for an in-plane switching liquid crystal display (IPS-LCD) device according to the related art.
Figure 3:
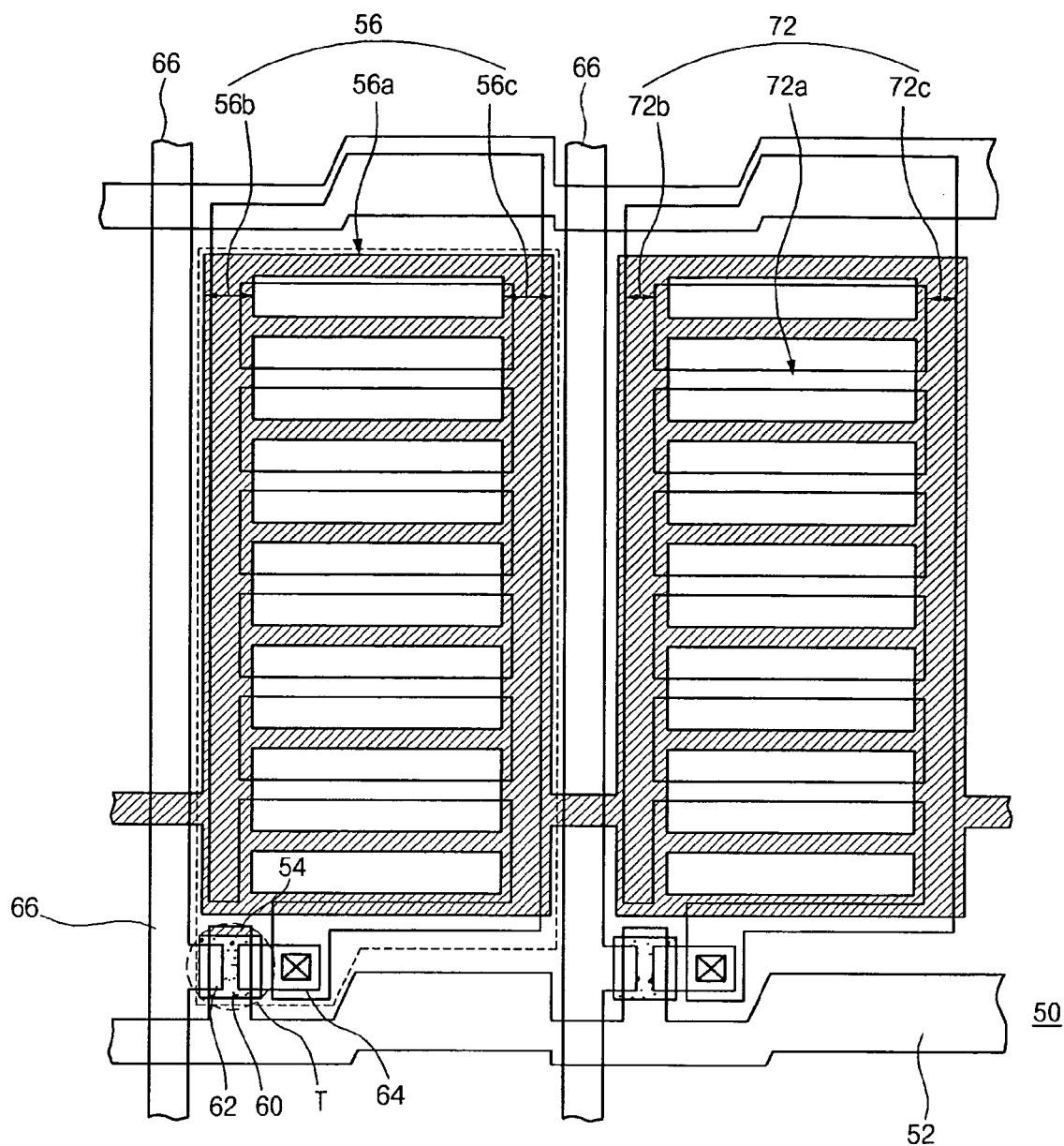
FIG. 3 is a plan view illustrating an array substrate for an IPS-LCD device according to the related art.
Figure 4:
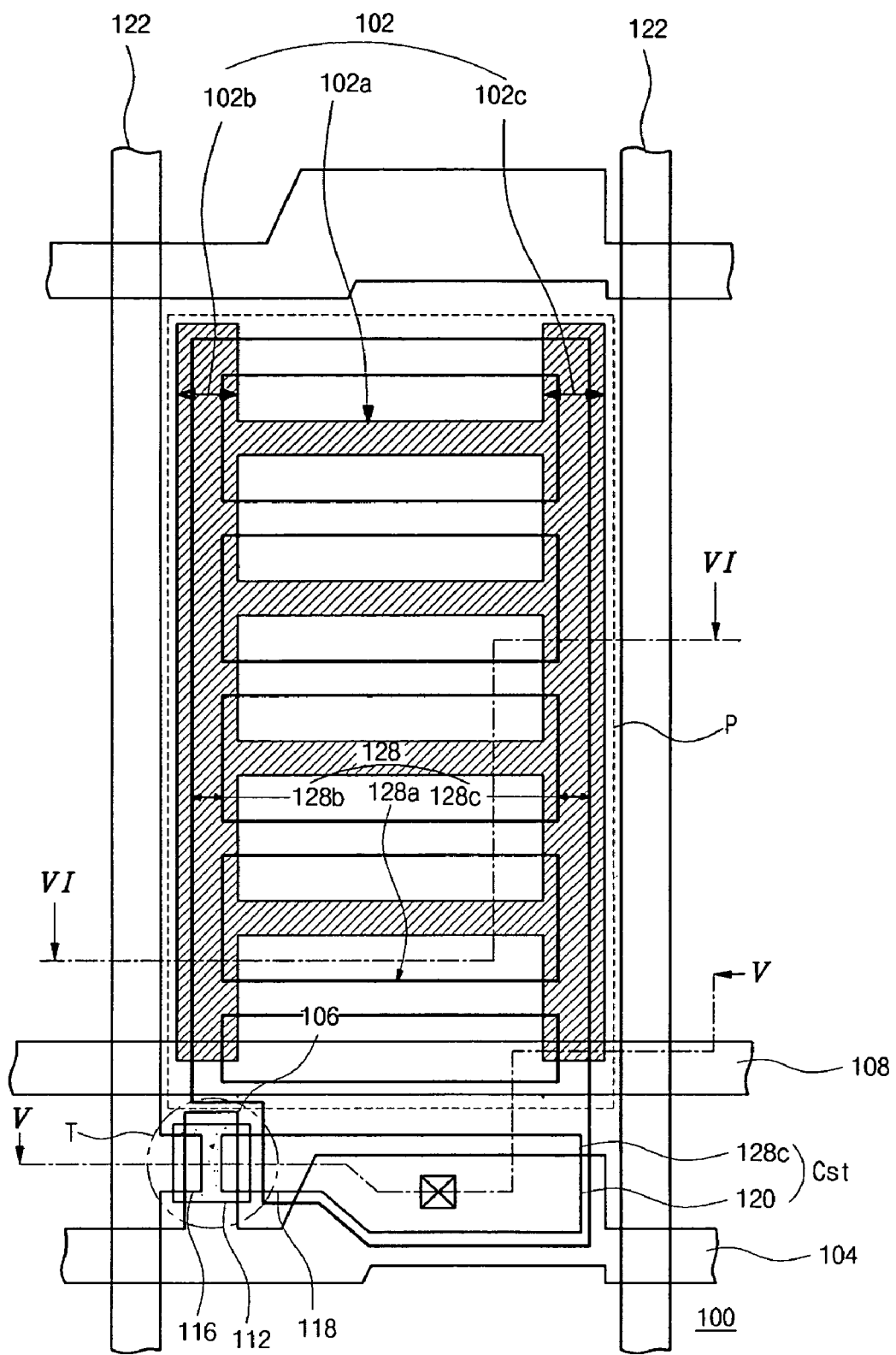
FIG. 4 is a plan view illustrating an array substrate for an in-plane switching liquid crystal display device according to an embodiment of the present invention.

FIG. 4 is a plan view illustrating an array substrate for an in-plane switching liquid crystal display device according to an embodiment of the present invention.

In FIG. 4, a gate line 104, a data line 122 and a common line 108 are formed on a substrate 100. The gate line 104 crosses the data line 122 to define a pixel region "P." In addition, the common line 108 is spaced apart from and substantially parallel to the gate line 104. The common line 108 may have one body throughout the adjacent pixel regions "P." A thin film transistor (TFT) "T" is connected to the gate line 104 and the data line 122. The TFT "T" includes a gate electrode 106, an active layer 112, a source electrode 116 and a drain electrode 118. A storage capacitor "Cst" including first and second capacitor electrodes is connected to the TFT "T." A portion of the gate line 104 is used as the first capacitor electrode and an extension portion 120 extending from the drain electrode 118 is used as the second capacitor electrode over the first capacitor electrode.

A common electrode 102 and a pixel electrode 128 having a bar shape are formed in the pixel region "P." The common electrode 102 contacts the common line 108 and the pixel electrode 128 contacts the drain electrode 118. The common electrode 102 and the pixel electrode are formed of a transparent conductive material. Further, the common electrode 102 includes a plurality of common horizontal portions 102a, a first common vertical portion 102b and a second common vertical portion 102c. The plurality of common horizontal portions 102a are disposed along a horizontal direction substantially parallel to the gate line 104, and the first and second common vertical portions 102b and 102c are connected to two ends of each common horizontal portion 102a, respectively. Similarly, the pixel electrode 128 includes a plurality of pixel horizontal portions 128a, a first pixel vertical portion 128b and a second pixel vertical portion 128c. The plurality of pixel horizontal portions 128a are disposed along a horizontal direction substantially parallel to the gate line 104, and the first and second pixel vertical portions 128b and 128c are connected to two ends of each pixel horizontal portion 128a, respectively.

Since the common electrode 102 and the pixel electrode 128 are formed of a transparent material, aperture ratio and brightness of the IPS-LCD device are improved. When the common electrode 102 is formed of a transparent material, the common electrode 102 may have a width different to a designed value due to reflection at a lift pin hole of a chuck supporting the substrate 100 during an exposing step. An exposing machine has the chuck for supporting the substrate and a lift pin moves the substrate 100 up and down through the lift pin in the chuck. During the exposing step, the substrate 100 having a transparent material layer for the common electrode and a photoresist (PR) layer is loaded on the chuck and is exposed to light. Since the transparent material layer for the common electrode 102 and the PR layer are transparent, the light passes through the PR layer and the transparent material layer for the common electrode 102 and reflects at the lift pin hole. As a result, the intensity of the light irradiated onto the PR layer is changed, and the common electrode 102 adjacent to the lift pin hole has a width different from the other common electrode. The difference of the common electrode 102 in width causes non-uniform brightness of the IPS-LCD device such as a stain.

To solve the above problems such as a stain, the present invention provides a method of fabricating an IPS-LCD device having a uniform brightness.

FIGS. 5A to 5G and FIGS. 6A to 6G are cross-sectional views illustrating a method of fabricating an array substrate for an in-plane switching liquid crystal display device according to an embodiment of the present invention. FIGS. 5A to 5E are taken along a line V-V of FIG. 4, and FIG. 6A to 6G are taken along a line VI-VI of FIG. 4.

Figure 5A:
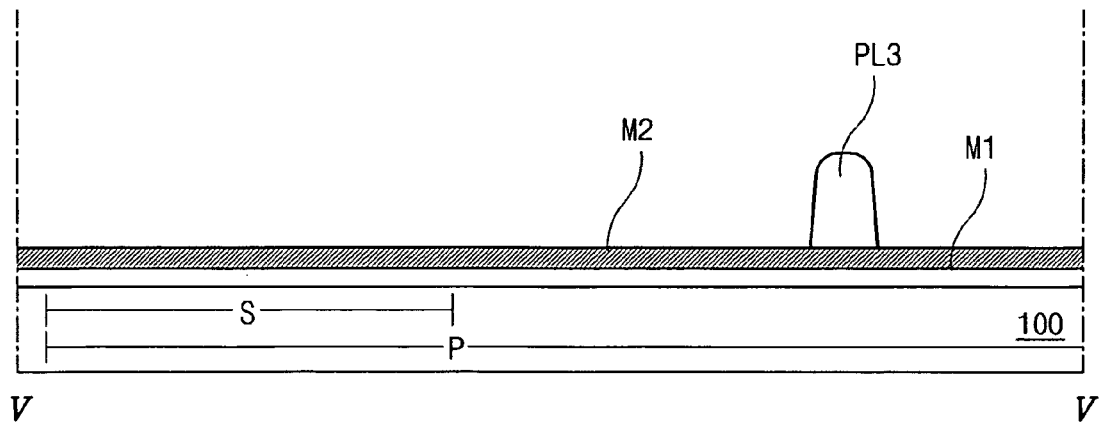
FIGS. 5A to 5G and FIGS. 6A to 6G are cross-sectional views, which are taken along a line V-V of FIG. 4, illustrating a method of fabricating an array substrate for an in-plane switching liquid crystal display device according to an embodiment of the present invention.
Figure 6A:
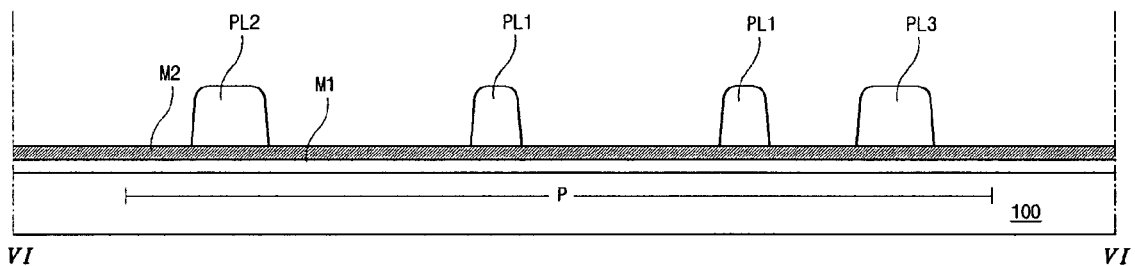

In FIGS. 5A and 6A, a transparent material layer "M1" and an opaque material layer "M2" are sequentially formed on a substrate 100 having a pixel region "P." The transparent material layer "M1" and the opaque material layer "M2" form a double layer. The pixel region "P" includes a switching region "S." The transparent material layer "M1" includes a transparent conductive material such as indium-tin-oxide (ITO) and indium-zinc-oxide (IZO). In addition, the opaque material layer "M2" includes an opaque metallic material. The transparent conductive material for the transparent material layer "M1" and the opaque metallic material for the opaque material layer may be concurrently etched by an etching solution or may be etched with different etch rates using different etching solutions.

After a photoresist (PR) layer (not shown) is formed on the opaque material layer "M2," the PR layer is exposed and developed to form PR patterns including a plurality of PR horizontal portions "PL1," a first PR vertical portion "PL2" and a second PR vertical portion "PL3." The first and second PR vertical portions "PL2" and "PL3" are connected to two ends of each PR horizontal portion "PL1." While the PR layer is exposed to light, the light is blocked by the opaque material layer "M2" and does not reach a lift pin hole of a chuck supporting the substrate 100. Accordingly, deterioration such as a stain caused by the chuck is prevented.

The opaque material layer "M2" and the transparent material layer "M1" are patterned using the PR patterns as an etch mask. The opaque material layer "M2" and the transparent material layer "M1" may be etched with a single etching solution at the same time or may be sequentially etched with different etching solutions.

Figure 5B:
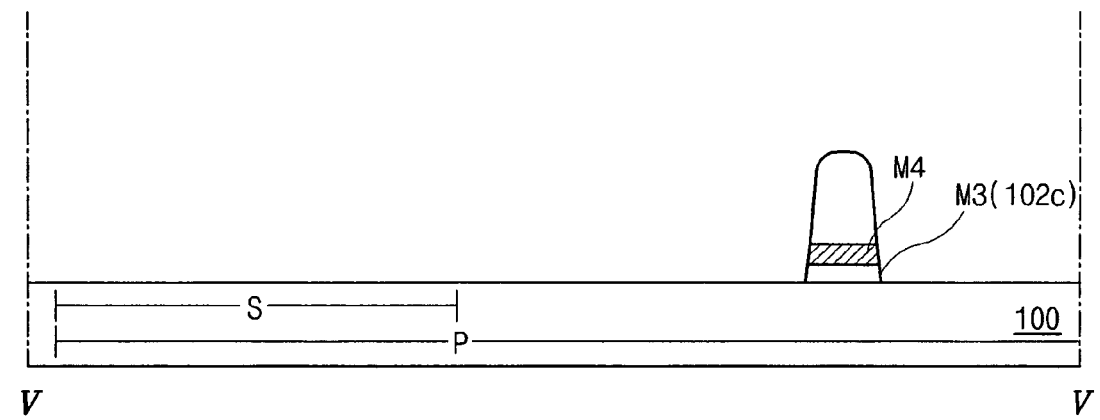
Figure 6B:
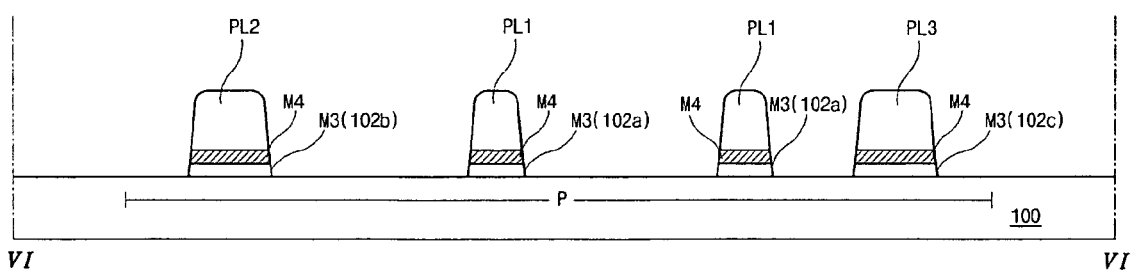

In FIGS. 5B and 6B, a transparent material pattern "M3" and an opaque material pattern "M4" on the transparent material pattern "M3" are obtained under the PR patterns. The PR patterns and the opaque material pattern "M4" are removed and a common electrode corresponding to the transparent material pattern "M3" is obtained. The common electrode includes a plurality of common horizontal portions 102a, a first common vertical portion 102b and a second common vertical portion 102c.

Figure 5C:
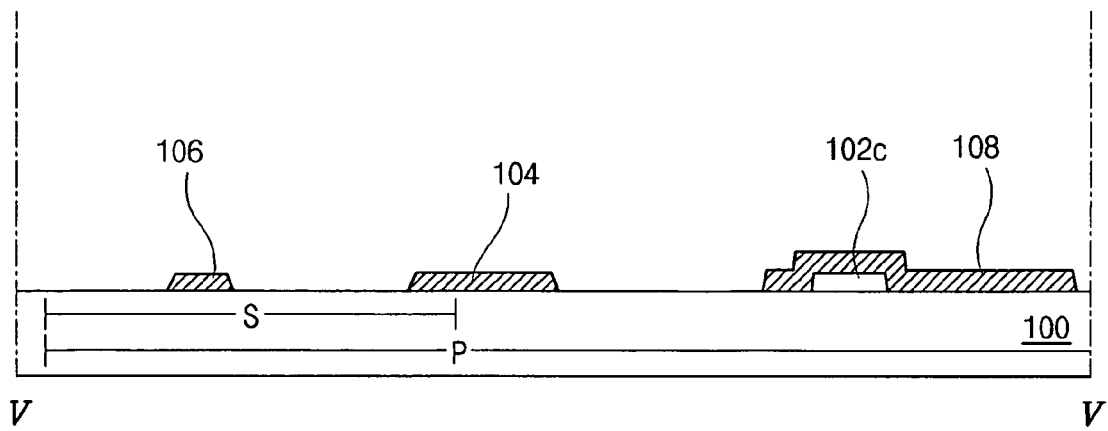
Figure 6C:
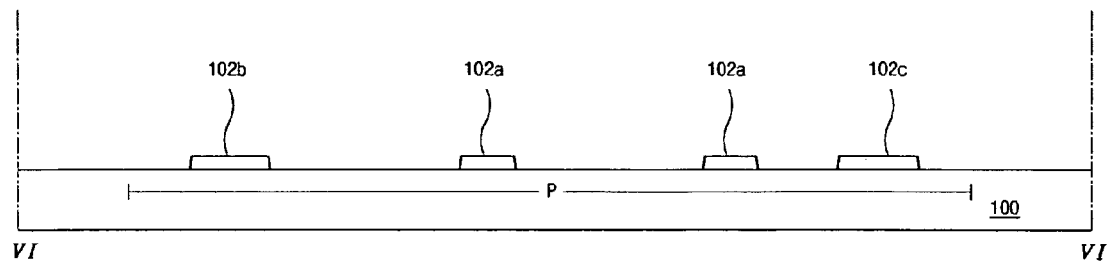

In FIGS. 5C and 6C, a gate line 104, a gate electrode 106 and a common line 108 are formed on the substrate 100 having the common electrode 102 by depositing and patterning a metallic material such as aluminum (Al), aluminum (Al) alloy, chromium (Cr), copper (Cu), titanium (Ti), tungsten (W) and molybdenum (Mo). The gate electrode 106 is connected to the gate line 104 and the common line 108 contacts the common electrode 102.

Figure 5D:
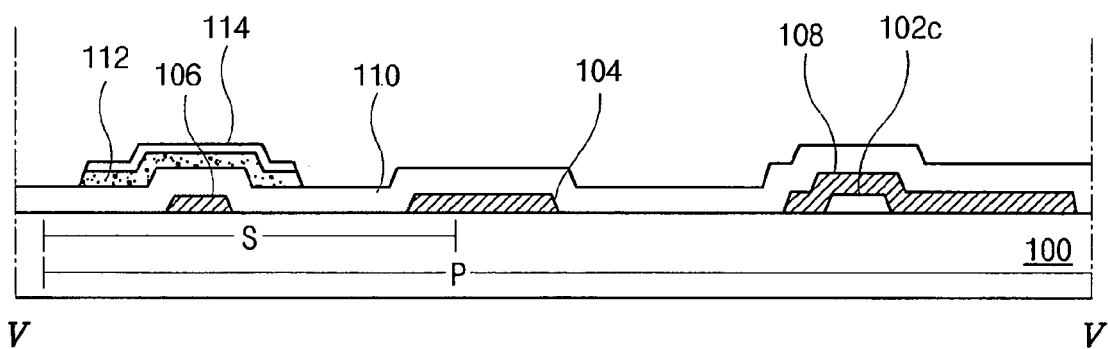
Figure 6D:
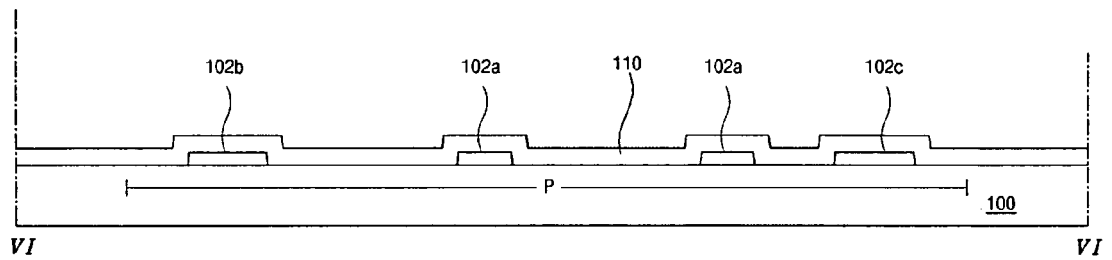

In FIGS. 5D and 6D, a gate insulating layer 110 is formed on the gate line 104, the gate electrode 106 and the common line 108 by depositing an inorganic insulting material such as silicon oxide ($SiO_2$) and silicon nitride (SiNx). An active layer 112 and an ohmic contact layer 114 are formed on the gate insulating layer 110 over the gate electrode 106 by depositing and patterning an intrinsic amorphous silicon (a-Si:H) and an impurity-doped amorphous silicon (n+a-Si:H).

Figure 5E:
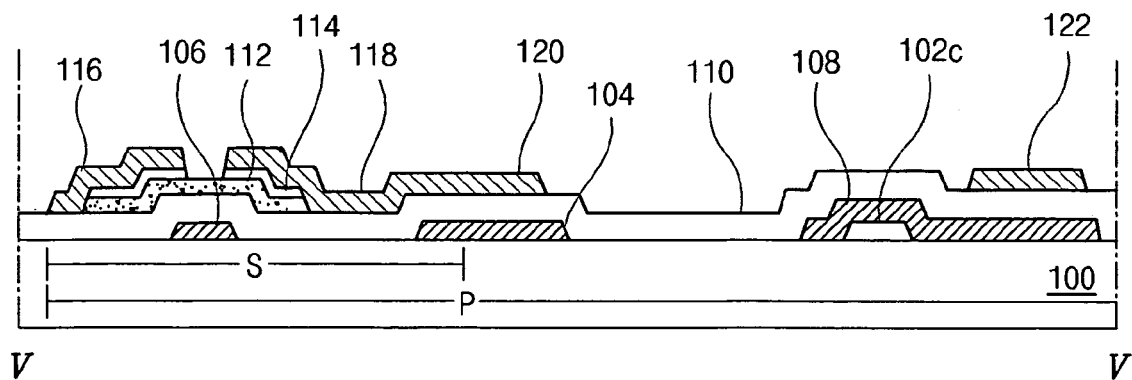
Figure 6E:
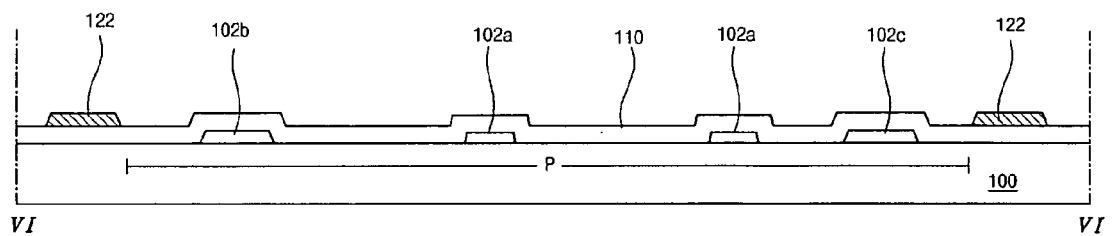

In FIGS. 5E and 6E, a source electrode 116, a drain electrode 118, an extension portion 120 and a data line 122 are formed on the substrate 100 having the active layer 112 and the ohmic contact layer 114 by depositing and patterning a metallic material such as aluminum (Al), aluminum (Al) alloy, chromium (Cr), copper (Cu), titanium (Ti), molybdenum (Mo) and molybdenum tungsten (MoW). The source and drain electrodes 116 and 118 contact the ohmic contact layer 112 and are spaced apart from each other. The extension portion 120 extends from the drain electrode 118 and is formed over the gate line 104. In addition, the data line 122 is connected to the source electrode 116 and crosses the gate line 104. A portion of the ohmic contact layer 114 between the source and drain electrodes 116 and 118 is removed to expose the active layer 112.

Figure 5F:
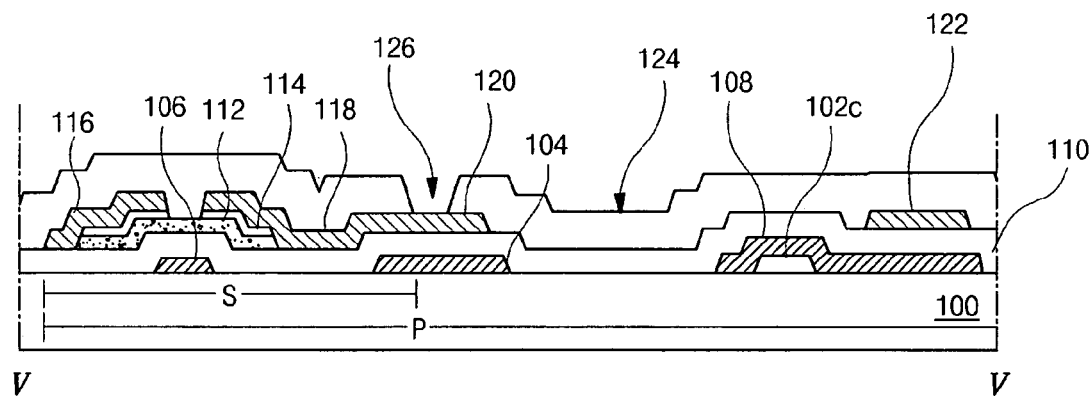
Figure 6F:
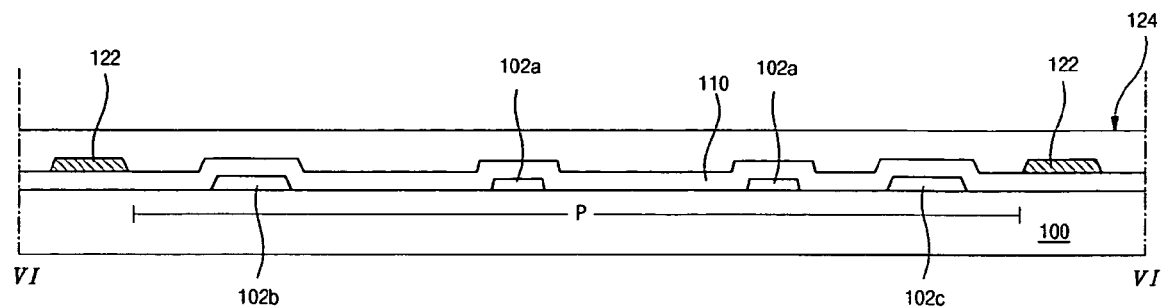

In FIGS. 5F and 6F, a passivation layer 124 is formed on the source electrode 116, the drain electrode 118, the extension portion 120 and the data line 122 by depositing and patterning one of an inorganic insulating material such as silicon oxide (SiO$_2$) and silicon nitride (SiNx) and an organic insulating material such as benzocyclobutene (BCB) and acrylic resin. The passivation layer 124 has a drain contact hole 126 exposing the drain electrode 118.

Figure 5G:
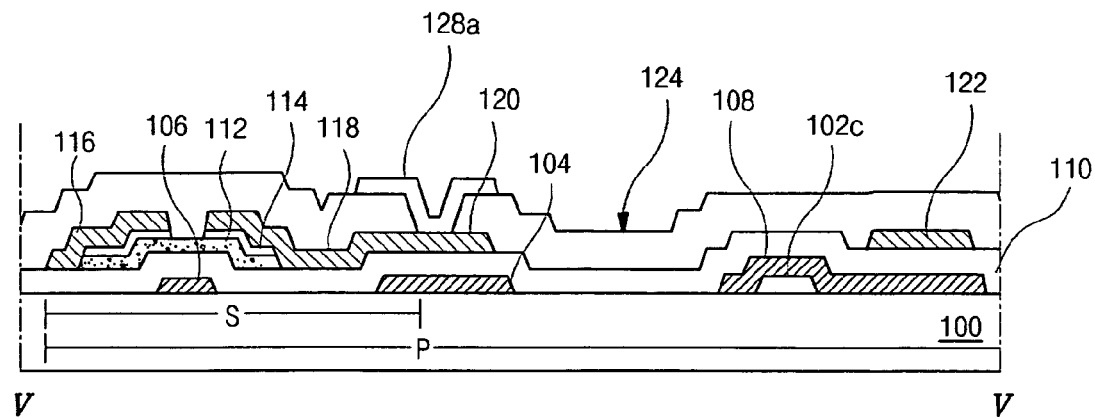
Figure 6G:
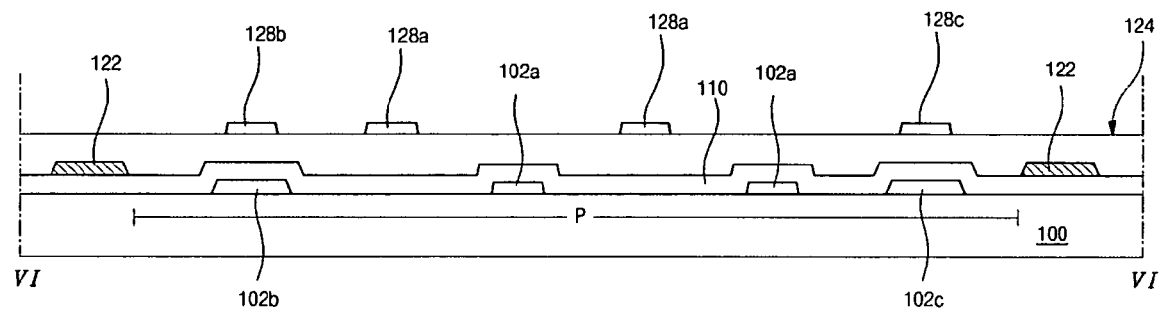

In FIGS. 5G and 6G, a pixel electrode 128 is formed on the passivation layer 124 by depositing and patterning a transparent conductive material such as indium-tin-oxide (ITO) and indium-zinc-oxide (IZO). The pixel electrode 128 contacts the drain electrode 118 through the drain contact hole 126. In addition, the pixel electrode 128 includes a plurality of pixel horizontal portions 128a, a first pixel vertical portion 128b and a second pixel vertical portion 128c. The plurality of pixel horizontal portions 128a alternate with the plurality of common horizontal portions 102a, and the first and second pixel vertical portions 128b and 128c are connected to two ends of each pixel horizontal portion 128a. Even though the pixel electrode 128 includes a transparent material, the pixel electrode 128 does not use a opaque material layer because multiple layers are formed under the pixel electrode 128. Since the multiple layers under the pixel electrode 128 absorb the light reflected at the lift pin hole of the chuck, the pixel electrode 128 having a uniform width is obtained.

Consequently, an IPS-LCD device of the present invention has a number of advantages. First, since the pixel electrode and the common electrode include a transparent material, aperture ratio and brightness are improved. Secondly, since the common electrode on a substrate is formed using a transparent material layer and an opaque material layer, deterioration such as a stain due to the chuck is prevented. As a result, a display quality of the IPS-LCD device is improved.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method of fabricating an array substrate for an in-plane switching liquid crystal display device, comprising:
   forming a common electrode on a substrate using a double layer of a transparent material layer and an opaque material layer, the common electrode including a first transparent conductive material;
   forming a gate line, a gate electrode and a common line on the substrate, the gate electrode being connected to the gate line, the common line contacting the common electrode;
   forming a gate insulating layer on the gate line, the gate electrode, the common electrode and the common line;
   forming an active layer and an ohmic contact layer on the gate insulating layer over the gate electrode;
   forming source and drain electrodes on the ohmic contact layer and a data line connected to the source electrode, the source and drain electrodes being spaced apart from each other;
   forming a passivation layer on the source and drain electrodes and the data line, the passivation layer including a drain contact hole exposing the drain electrode; and
   forming a pixel electrode on the passivation layer, the pixel electrode including a second transparent conductive material and being formed in an alternating pattern with the common electrode, the pixel electrode contacting the drain electrode through the drain contact hole.

2. The method according to claim 1, wherein the common electrode and the pixel electrode have a substantially bar shape.

3. A method of fabricating an array substrate for an in-plane switching liquid crystal display device, comprising:
   forming a common electrode on a substrate using a double layer of a transparent material layer and an opaque material layer, the common electrode including a first transparent conductive material;
   forming a gate line, a gate electrode and a common line on the substrate, the gate electrode being connected to the gate line, the common line contacting the common electrode;
   forming a gate insulating layer on the gate line, the gate electrode and the common line;
   forming an active layer and an ohmic contact layer on the gate insulating layer over the gate electrode;
   forming source and drain electrodes on the ohmic contact layer and a data line connected to the source electrode, the source and drain electrodes being spaced apart from each other;
   forming a passivation layer on the source and drain electrodes and the data line, the passivation layer including a drain contact hole exposing the drain electrode; and
   forming a pixel electrode on the passivation layer, the pixel electrode including a second transparent conductive material and being formed in an alternating pattern with the common electrode, the pixel electrode contacting the drain electrode through the drain contact hole,
   wherein forming the common electrode comprises:
   sequentially forming the transparent material layer on the substrate and the opaque material layer on the transparent material layer;
   forming a photoresist pattern on the opaque material layer;
   etching the opaque material layer and the transparent material layer using the photoresist pattern as an etch mask to form an opaque material pattern and the common electrode; and
   removing the photoresist pattern and the opaque material pattern.

4. A method of fabricating an array substrate for an in-plane switching liquid crystal display device, comprising:
   forming a common electrode on a substrate using a double layer of a transparent material layer and an opaque material layer, the common electrode including a first transparent conductive material;
   forming a gate line, a gate electrode and a common line on the substrate, the gate electrode being connected to the gate line, the common line contacting the common electrode;
   forming a gate insulating layer on the gate line, the gate electrode and the common line;
   forming an active layer and an ohmic contact layer on the gate insulating layer over the gate electrode;
   forming source and drain electrodes on the ohmic contact layer and a data line connected to the source electrode, the source and drain electrodes being spaced apart from each other;
   forming a passivation layer on the source and drain electrodes and the data line, the passivation layer including a drain contact hole exposing the drain electrode; and forming a pixel electrode on the passivation layer, the pixel electrode including a second transparent conductive material and being formed in an alternating pattern with the common electrode, the pixel electrode contacting the drain electrode through the drain contact hole, wherein the common electrode is formed to include a plurality of common horizontal portions, a first common vertical portion and a second common vertical portion, the first and second common vertical portions being connected to two ends of each common horizontal portion, respectively.

5. The method according to claim 4, wherein the pixel electrode is formed to include a plurality of pixel horizontal portions, a first pixel vertical portion and a second pixel vertical portion, the plurality of pixel horizontal arranged in an alternating pattern with the plurality of common horizontal portions, the first and second pixel vertical portions being connected to two ends of each pixel horizontal portion, respectively.

6. The method according to claim 1, wherein the first and second transparent conductive materials include one of indium-tin-oxide (ITO) and indium-zinc-oxide (IZO).

7. A method of fabricating an array substrate for an in-plane switching liquid crystal display device, comprising:
forming a common electrode on a substrate using a double layer of a transparent material layer and an opaque material layer, the common electrode including a transparent material;
forming a gate line and a common line on the substrate, the common line contacting the common electrode;
forming a data line crossing the gate line;
forming a thin film transistor connected to the gate line and the data line;
forming a passivation layer on the thin film transistor and over the common electrode; and
forming a pixel electrode on the passivation layer, the pixel electrode being connected to the thin film transistor.

8. The method according to claim 7, wherein forming the thin film transistor comprises:
forming a gate electrode connected to the gate line;
forming a gate insulating layer on the gate electrode;
forming an active layer on the gate insulating layer over the gate electrode;
forming an ohmic contact layer on the active layer;
forming source and drain electrodes on the ohmic contact layer, the source electrode being connected to the data line and the drain electrode being connected to the pixel electrode.

9. A method of fabricating an array substrate for an in-plane switching liquid crystal display device, comprising:
forming a common electrode on a substrate using a double layer of a transparent material layer and an opaque material layer, the common electrode including a transparent material;
forming a gate line and a common line on the substrate, the common line contacting the common electrode;
forming a data line crossing the gate line;
forming a thin film transistor connected to the gate line and the data line;
forming a passivation layer on the thin film transistor; and
forming a pixel electrode on the passivation layer, the pixel electrode being connected to the thin film transistor,
wherein forming the common electrode comprises:
forming a transparent material layer on the substrate;
forming an opaque material layer on the transparent material layer;
forming a photoresist pattern on the opaque material layer;
etching the opaque material layer and the transparent material layer using the photoresist pattern as an etch mask to form the common electrode and an opaque material pattern on the common electrode;
removing the photoresist layer; and
etching the opaque material pattern to expose the common electrode.

10. The method according to claim 9, wherein the opaque material layer and the transparent material layer are concurrently etched with a single etching solution.

11. The method according to claim 9, wherein the opaque material layer and the transparent material layer are sequentially etched using different etching solutions.

* * * * *